Nov. 14, 1967  W. T. MEYER  3,352,956
METHOD OF PREPARING GEOMETRICALLY UNIFORM
ROLLS OF PLASTIC FILM
Filed July 22, 1964
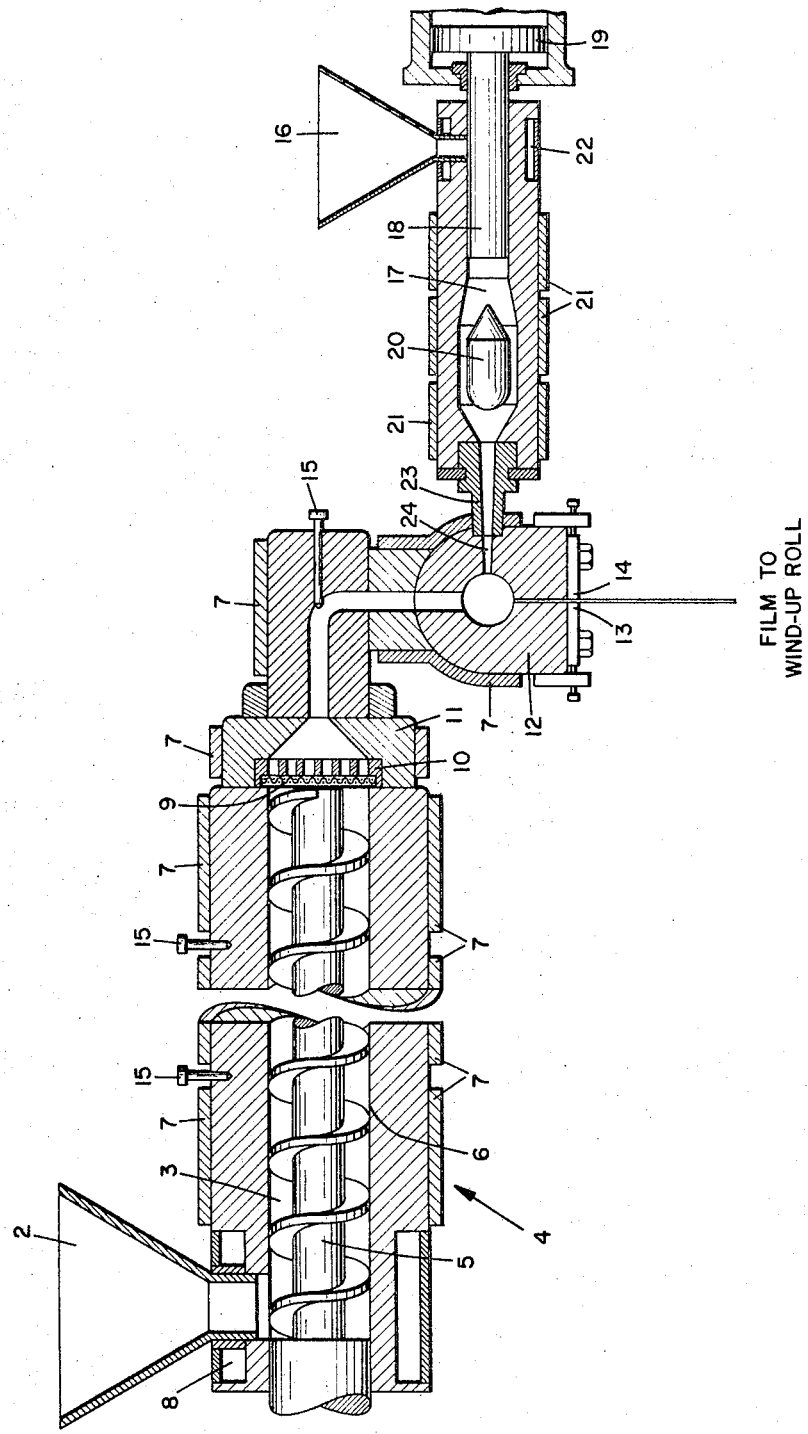
WERNER T. MEYER   INVENTOR
BY  Harold Einhorn
PATENT ATTORNEY

United States Patent Office 3,352,956
Patented Nov. 14, 1967

3,352,956
METHOD OF PREPARING GEOMETRICALLY UNIFORM ROLLS OF PLASTIC FILM
Werner T. Meyer, Scarsdale, N.Y., assignor to Esso Research and Engineering Company, a corporation of Delaware
Filed July 22, 1964, Ser. No. 384,341
3 Claims. (Cl. 264—176)

ABSTRACT OF THE DISCLOSURE

Geometrically uniform rolls of thermoplastic film are formed by varying the location of high or low spots on the surface of extruded film by injecting minor amounts of resin into the film extrusion die at a point before the main flow of resin reaches the film extrusion die lips.

---

This invention relates to a method of preparing geometrically uniform rolls of film made of thermoplastic materials. More particularly, the invention relates to a method of preparing geometrically uniform rolls of plastic film utilizing conventional extrusion techniques.

One of the key requirements in the sale of plastic films is the geometric uniformity of the roll of film that is manufactured. This uniform geometry of the roll is normally quite difficult to achieve as pronounced high and low areas are often present in a roll of extruded film. The differences in thicknesses of the wound-up film are due to the fact that at certain definite places on the film the cross-sectional thickness varies, e.g. about 0.1 mil or more thicker or thinner than the rest of the film due to rheological effects in the area of the die lips of the extusion device and/or non-parallel die lips. Unless the extruder is oscillated in a sheet set-up or the wind-up roll is rotated in a tubular set-up, high and low spots will appear on the roll of film because the thicker and/or thinner parts of the film are taken up in the same place on the roll giving the roll an undulating surface that presents difficulties in further processing or makes the roll of film less salable if not further processed.

In accordance with the invention, the location of high or low spots occurring at definite and cumulative positions on the extruded film are varied by independently introducing minor amounts of resin maintained at essentially the same temperature as the resin being extruded into the die at a point before the main flow of resin reaches the die lips. Employing the above technique causes the high and/or low spots to be distributed across the plane of the film being extruded rather than having the high or low spots form at the same place on the film as is evidenced when conventional film extrusion techniques are used.

The resin should be introduced into the die area behind the die lips at relatively short intervals, e.g. 10 seconds to 1 minute, at a pressure not exceeding 20%, preferably 10%, in excess of the die pressure. The injection of the resin at the higher pressure should last for only a fraction of a second and the total volume of resin introduced should not exceed about 10 vol. percent of the resin being extruded into film during the introduction interval.

The number of resin introduction points necessary to compensate for the effects which cause the formation and positioning of the high or low spots will depend upon the length or circumference of the extrusion die. In the case of small dies, i.e. up to about 12 to 15 inches in length or circumference, one such pulsation means at the die end will probably suffice. For larger dies, two or more introduction points may be needed.

The invention will be more readily understood by reference to the following detailed description taken in connection with the accompanying drawing which is a cross-sectional view of a conventional film extruder in combination with a ram pressure injection machine.

Referring now to the figure, a thermoplastic resin such as polyethylene or polypropylene is fed into the funnel-shaped hopper 2. The resin drops by gravity into channel 3 of extruder 4. A screw 5, driven by means not shown, rotates within hardened liner 6 of the extruder barrel, or cylinder, and the resin is forced forward by the rotating screw.

As the thermoplastic resin moves forward, it is heated by friction, compression and by means of heaters 7, melted, thoroughly mixed, and compressed by a series of flow patterns inside the screw channels. Cooling jacket 8 is provided to prevent the resin particles present in hopper 2 from melting and agglomerating thus restricting the free gravity flow of resin into the extruder channel. After the resin has been thoroughly heated, melted and mixed, the melt finally passes through screen pack 9, supported by breaker plate 10, and die adapter 11 to sheet die 12 including two knife-edged die lips 13 and 14. The screen pack serves primarily as a filter for foreign matters that may have been present in the hopper. It also serves to increase back pressure in the extruder barrel, especially when no extruder valve is used.

The temperature at various points along the extruder barrel is usually determined by means of thermocouples 15 seated in a well in the barrel wall. Another thermocouple 15 should be inserted through the die 12 into the thermoplastic resin melt itself to determine the actual melt temperature as close to the die opening as possible. The quality of the extruded product is closely dependent on the viscosity and, hence, the temperature of the melt itself. Elements of design of the extruder for the manufacture of any particular thermoplastic resin film are well known to those skilled in the extrusion art and will not be enumerated for the purpose of brevity.

Many suitable mechanical means can be used to periodically inject resin into the die of the extruder in order to alter the distribution of the resin present in the die. Suitable devices include small capacity metering pumps, small capacity screw extruders similar to the device previously depicted that are equipped with suitable valving means or run intermittently, and ram injectors that are usually used in injection molding machines. Depicted in the figure, in combination with the conventional screw extrudng machine is a ram pressure injector that serves to periodically introduce small amounts of resin into the extrusion die at a point just before the die lips.

In operation, thermoplastic resin pellets of the same type used in the film extruder are poured into hopper 16 from which they are dropped into cylinder 17 while ram 18 is retracted. At the beginning of the injection cycle, the ram actuated by piston 19 pulses rapidly forward and forces the resin into cylinder 17, compacting it tightly behind and around plasticizing torpedo 20 which is centrally located. Heat is supplied to the cylinder walls and torpedo by electric heaters 21. Cooling jacket 22 is positioned around part of the outer wall of the cylinder to maintain the resin present in the hopper at a temperature below its softening point.

Fins are integrally attached to torpedo 20 to serve to keep the torpedo centered and also to transfer heat to the torpedo from the hot cylinder walls, although in some ram injection machines the torpedo is heated separately. Heat and pressure join in plasticizing the thermoplastic resin in a manner similar to that enunciated in the descrption of the film extrusion machine. As the melted resin moves forward in the cylinder, its temperature approaches that of the cylinder. It is mixed in the passage around the torpedo, becomes more fluid and uniform, and reaches the required fluidity at the time it arrives at the cylinder nozzle 23.

The ram pressure forces the thermoplastic resin melt that is maintained at a temperature substantially the same as the resin in the die of the extrusion device, at a high rate of flow, and at a pressure at least 10% greater than the pressure in the extrusion die, through nozzle 23 and sprue 24 into the cavity of the die located at the end plate or behind the lips 13 and 14 of the die. The resin then passes through the lips of the die while a film of the thermoplastic resin is produced.

The film can then be processed in a variety of ways and ultimately taken up on a wind-up roll. The roll of film formed using the method of the present invention is substantially geometrically uniform due to the fact that the usual high and low areas normally associated with film extrusion techniques have been distributed randomly over the plane of the film rather than being constantly located at a particular spot on the film surface.

The temperatures at which thermoplastic resins are extruded is dependent upon a variety of processing conditions. For example, polypropylene is normally extruded at temperature ranging from 450° to 550° F., polyvinylchloride is extruded at temperatures varying in the range of from about 275° to 350° F., a sheet stock of polyethylene is formed at temperatures varying from 300° to 600° F. Die pressures in extrusion operations can also vary over a wide range depending upon variables such as extruder screw pitch, extrusion temperature, and the thickness of the sheet stock desired. Extrusion temperatures and die pressures for the manufacture of any particular thermoplastic resin film are conditions well known to those skilled in the art.

The nature of the present invention having been fully set forth, what is claimed as new and useful and desired to be secured by Letters Patent is:

1. In a process for the formation of rolls of film of thermoplastic resins wherein resin is continuously extruded through a die at a temperature above its softening point, the improvement which comprises periodically injecting a minor amount of the same resin being extruded into the die, said resin being injected into the die at time intervals varying from 10 seconds to one minute at a temperature substantially identical to the resin temperature in the die and at a pressure not exceeding about 10% in excess of the die pressure, where the total amount of resin injected into the die per injection does not exceed 10 vol. percent of the resin being extruded into film during the injection time interval.

2. The process of claim 1 wherein the die is a sheet die.

3. The process of claim 1 wherein the die is a tubular die.

References Cited

UNITED STATES PATENTS 2,803,041    8/1957    Hill et al. _____ 18—12

ROBERT E. WHITE, *Primary Examiner.*

G. AUVILLE, *Assistant Examiner.*